3,078,552
COPPER FOAM MATERIAL AND METHOD
Max F. Grandey, Hamilton, Ohio, assignor to General Electric Company, a corporation of New York
No Drawing. Filed Dec. 3, 1959, Ser. No. 856,900
6 Claims. (Cl. 29—182)

This invention relates to copper foam material and to a method for making same.

Foamed materials sometimes called cellular or porous materials have been used as lightweight structures, particularly in airborne apparatus, as well as for fluid control barriers, heat exchanger elements and the like.

Numerous methods have been proposed for preparing foamed or porous materials. However, such methods frequently result in porous materials of non-uniform density and porosity. Hence they have variable strength.

One object of this invention is to provide an improved method for producing a uniformly porous, lightweight copper foam of uniform strength.

Another object is to provide a lightweight porous copper material having uniformly good electrical and heat conducting characteristics.

These and other objects, advantages and features of the invention will become apparent from the following more detailed description and illustrative examples. Such description and examples are not meant to be limitations on the invention, the scope of which is pointed out in the appended claims.

Briefly, the method of this invention in one form involves (1) mixing a copper powder with a phenolic foamable resin, a linking or catalyzing agent, a bodying agent, and a foaming agent, (2) foaming the mixture, (3) preliminarily curing the mixture into a foamed material, (4) heating the material at a temperature and for a time sufficient to decompose the organic ingredients, (5) heating the material at a temperature and for a time sufficient to preliminarily sinter the copper powder, (6) heating the material in an oxidizing atmosphere at a temperature and for a time sufficient to oxidize the residue of the organic ingredients, (7) and then heating the material at a temperature sufficient to finally sinter the copper powder.

The article of this invention is a uniformly porous copper material which, in one form, has a density of about 0.05–0.09 pound per cubic inch and a copper content of about 7–13 grams of copper per cubic inch of article volume.

One of the advantages of the product of this invention lies in its use in the field of electrical conductors. Because of its controllable uniform density and high surface area, its electrical properties can be readily calculated. As an electrical conductor, it has a surface area much larger than that of solid copper and therefore can cool itself more readily than can solid copper. Thus it has lower resistivity and better conductivity because it is capable of operating at a lower temperature. The use of the porous copper of this invention in heat exchangers has been shown to allow heat radiation faster than other currently employed configurations such as fins and the like.

The basic materials used in the method of this invention are (1) a copper or copper alloy powder preferably of electrolytic grade, (2) a phenolic foamable resin, (3) a linking or catalyzing agent for phenolic resins, (4) a foaming or gas producing agent, (5) and a bodying resin to keep the product from sagging during the early stages of heat treatment.

Although, we have indicated that a foaming agent, a bodying agent and a catalyzing agent are included in one form of the method of this invention, it is to be understood that if a phenolic foamable resin includes any or all of these characteristics or agents, it is intended that the use of such a material would fall within the scope of this invention. In addition, it is intended that commercially available hardening agents frequently used in plastic casting operations commercially may be included without departing from the scope of the invention.

Before inter-mixing the basic parts, it is preferred that the copper powder be in a clean or relatively un-oxidized stage. For example, the copper powder may be reduced by chemical means or by heating in a reducing atmosphere to remove all oxide. Although this preliminary step is not mandatory, it has been found that it assures better results in later processing.

Broadly, the method of this invention involves first making an intimate mixture of copper powder, phenolic foamable resin, a bodying agent, a catalyzing or linking agent and a foaming agent. This mixture is then placed in the mold or confining chamber to allow reaction or foaming to take place. If a specific size or shape of product is desired, a shaped mold can be sealed after a calculated quantity of ingredient has been introduced to produce the density and size of product desired.

After reaction has taken place and a porous or foamed copper mixture results, the mold is then heated at a relatively low temperature such as about 100–300° F. for up to about 2 hours to cure the foamed mixture into a foamed material.

The foamed material can then be removed from the mold and placed in a furnace or retort having a non-oxidizing or reducing atmosphere, for example hydrogen. The temperature of the retort or furnace is increased preferably at a slow rate to a moderately high temperature such as about 1200° F. sufficient to decompose the organic ingredients in the mixture. Then the temperature is slowly increased to about 1800° F. where it is held for up to about 1 hour to preliminarily sinter the copper powder.

After the preliminary heat treatment step, the material is then cooled and can be removed from the non-oxidizing atmosphere. It is then placed into an oxidizing atmosphere which may be at or may be raised to a temperature of about 800–100° F. The porous material can be held at this temperature for up to about 5 hours to oxidize the carbon residue from the decomposed organic ingredients. The porous material is then placed once again in a non-oxidizing atmosphere retort in which the temperature is again increased to about 1800° F. and held for up to about 2 hours. After this final sintering heat treatment, the material is cooled in a non-oxidizing atmosphere to prevent oxide formation. It is then removed from the retort.

This invention will be better understood from the following illustrative examples which are not meant to be limitations on the scope of the invention.

The percentages used in the examples are percent by weight.

Example 1

A mixture was made of about 61.3% (250 grams) electrolytic grade copper powder of −325 mesh size, 24.4% (100 grams) phenolic foamable resin and 4.9% (20 grams) acrylic resin solution as a bodying agent to prevent the product from sagging during the early stages of heat treatment. Phenol sulfonic acid was added as a catalyst in the amount of 9% (37 grams) and 0.4% (1.5 grams) of sodium bicarbonate was added as a foaming agent.

After intimately blending, the mixture was then placed in a 5.75" x 9" x 0.5" mold (25.9 cubic inches in volume) to allow reaction or foaming to take place. Thus the copper weight to mold volume ratio was 9.65 grams of copper powder per cubic inch of mold volume. After the reaction was completed, the mold was then cured in an oven at 150° F. for about 1 hour.

After curing, the foamed material was removed from the mold and placed in an 800° F. retort having a hydrogen atmosphere of −100° F. dew point at a flow rate of about 50 cubic feet per hour. The temperature in the retort was slowly increased over a period of about 3 hours to a temperature of about 1200° F. to decompose all organic matter included in the ingredients. The end of the decomposition period was indicated by an absence of all yellow color in the flame of the hydrogen being burned at the end of the retort exit. The temperature in the retort was then increased to about 1800° F. where it was held for about 1 hour.

The foamed material at this stage included preliminarily sintered copper with carbon interspersed throughout. The material was then placed in an air furnace (oxidizing atmosphere) in which it was heated at about 900° F. for about 3 hours to oxidize the carbon residue which remained from the decomposed organic ingredients. After oxidation and removal of the carbon, the material was again placed in a hydrogen atmosphere retort and heated to about 1800° F. for a time sufficient to bring about final sintering of the copper powder. In the case of the quantity of material of this example, the time was about 1.5 hours. A time-temperature relationship exists in this sintering step: lower temperatures require considerably longer times and slightly higher temperatures require less time to bring about final sintering. After the final sintering period, the temperature in the retort was allowed to fall below that temperature at which copper will oxidize. The foamed article was then removed from the hydrogen atmosphere retort.

The density of the final copper product is a function of the volume into which the initial mixture is allowed to foam as well as the amount of copper included in that mixture. In this example, the foamed copper product had a density of 0.067 pound per cubic inch. It was rigid yet ductile and was composed of a high percentage of principally interconnected voids.

*Example 2*

A porous copper material having a density of about 0.05 pound per cubic inch can be produced by following the method of Example 1 using the following ingredients: 54% (190 grams) electrolytic grade copper powder, 28.7% (100 grams) phenolic foamable resin, 5.7% (20 grams) bodying agent, 10.6% (37 grams) catalyst, 0.4% (1.5 grams) foaming agent and about 0.1% (0.5 gram) of a standard commercial hardener. The copper weight to mold volume ratio in this example was 7.34 grams of copper powder per cubic inch of mold volume.

*Example 3*

A porous copper material having a density of about 0.09 pound per cubic inch can be produced by following the method of Example 1 using the following ingredients: 51.8% (340 grams) electrolytic grade copper, 22.8% (150 grams) phenolic foamable resin, 4.6% (30 grams) bodying agent, 19% (125 grams) catalyst, 1.1% (7.5 grams) foaming agent, and about 0.7% (4.5 grams) hardener. In this example, because of the larger amount of copper powder included in the original mixture, considerably more catalyst and foaming agents were required along with an appropriate amount of hardener. Such added amounts impart more rapid lifting and quick hardening power to the resin in order to suspend the added amount of copper powder. The copper weight to mold volume ratio in this example was 13.1 grams of copper powder per cubic inch of mold volume.

Although the present invention has been described in connection with specific examples, these are to be construed as illustrative of rather than limitations on this invention. For example, the acrylic resin bodying agent, the phenol sulfonic acid linking agent and the sodium bicarbonate foaming agent may be replaced by similar materials well known to those skilled in the art. Thus, those skilled in the art will readily understand the variations and modifications of which this invention is capable.

This application is a continuation-in-part of United States Patent 2,917,384, issued December 15, 1959, for "Method of Making Foam Material from Nickel Powder."

What is claimed is:

1. A method for making porous copper material comprising the steps of: producing a mixture of a copper powder, a phenolic foamable resin, a catalyzing agent for phenolic resins, a bodying resin compatible with phenolic resin and which will keep the product from sagging during the early stages of heat treatment and a foaming agent; foaming the mixture; heating to preliminarily cure the mixture into a foamed material; heating the material at a temperature and for a time sufficient to decompose the organic ingredients in the mixture; heating the material at a temperature and for a time sufficient to preliminarily sinter the copper powder; heating the material in an oxidizing atmosphere at a temperature lower than that to preliminarily sinter the copper powder and for a time sufficient to oxidize residue of the organic ingredients; and then heating the material at a temperature sufficient to sinter the copper powder.

2. The method of claim 1 in which the weight of copper powder in the mixture is 7–13 grams of copper per cubic inch of volume of a mold into which the mixture is foamed.

3. A porous copper material produced according to the method of claim 2 and having a density of 0.05–0.09 pound per cubic inch.

4. A method for making a porous copper material comprising the steps of: producing a mixture of a fine copper powder, a phenolic foamable resin and an acrylic resin bodying agent; blending with that mixture a catalyzing agent for phenolic resins and a foaming agent to form a foamable mixture, the weight of copper powder in the foamable mixture being 7–13 grams of copper per cubic inch of volume of a mold into which the foamable mixture is to be foamed; foaming the mixture; curing the foamed mixture into a foamed material by heating at 100–300° F. for up to 2 hours; heating the material at a temperature and for a time sufficient to decompose the organic ingredients in the foamable mixture; heating the material at about 1800° F. to preliminarily sinter the copper powder; heating the material in an oxidizing atmosphere at a temperature below 1800° F. and for a time sufficient to oxidize residue of organic ingredients; and then heating the material at about 1800° F. to finally sinter the copper powder.

5. The method according to claim 4 in which the ingredients of the foamable mixture comprise in percent by weight 50–60% copper; 22–29% foamable phenolic resin; 4–6% acrylic resin solution; the remainder being catalyzing and foaming agents.

6. A method for making a porous copper material comprising the steps of: producing a mixture from about 61% fine copper powder, about 24% phenolic foamable resin and about 5% acrylic resin solution; blending with that mixture about 9% phenol sulfonic acid and about 0.4% sodium bicarbonate to form a foamable mixture; placing the foamable mixture in a mold; holding the foamable mixture in the mold to allow foaming to take place; heating the foamed mixture at about 150° F. for about 1 hour to cure the foamed mixture into a foamed material; placing the material in a non-oxidizing atmosphere retort at about 800° F.; slowly increasing the temperature of the retort to about 1200° F. to decompose organic matter included in the ingredients of the foamable mixture; increasing the temperature in the retort to about 1800° F. and holding for about 1 hour to preliminarily sinter the copper powder; placing the material in an oxidizing atmosphere at about 900° F. for about 3 hours to oxidize carbon residue remaining from decomposed organic ingredients; heating the material to about 1800° F. in an non-oxidizing atmosphere to finally sinter the copper powder.

References Cited in the file of this patent

UNITED STATES PATENTS

| | | |
|---|---|---|
| 1,988,861 | Thorausch | Jan. 22, 1935 |
| 2,917,384 | Grandey | Dec. 15, 1959 |